United States Patent [19]

Zimmerly

[11] Patent Number: 4,499,968
[45] Date of Patent: Feb. 19, 1985

[54] BORE LUBRICATOR

[75] Inventor: Harry L. Zimmerly, Largo, Fla.

[73] Assignee: Halkey-Roberts Corporation, St. Petersburg, Fla.

[21] Appl. No.: 302,777

[22] Filed: Sep. 16, 1981

[51] Int. Cl.³ .......................... F01M 9/00; F16N 7/14
[52] U.S. Cl. ...................................... 184/18; 184/29; 184/39
[58] Field of Search ................ 184/6.8, 6.17, 18, 19, 184/21, 22, 24, 25, 29, 32, 39, 65, 79; 86/19; 89/1 E; 222/216, 217; 184/1 D

[56]  References Cited

U.S. PATENT DOCUMENTS

| | | | |
|---|---|---|---|
| 491,224 | 2/1893 | Poore | 184/18 |
| 672,249 | 4/1901 | Woodard | 184/18 X |
| 730,813 | 6/1903 | Campbell et al. | 184/29 X |
| 1,056,371 | 3/1913 | Robinson | 184/79 X |
| 1,166,816 | 1/1916 | Cooper | 184/18 X |
| 1,173,916 | 2/1916 | Balmer | 184/18 X |
| 1,412,833 | 4/1922 | Blache | 184/18 |
| 2,188,105 | 1/1940 | Caldwell | 184/18 X |
| 2,426,073 | 8/1947 | Wallace | 184/18 X |
| 3,221,948 | 12/1965 | Kalist | 184/1 D |
| 3,268,638 | 8/1966 | Tann | 184/1 D |
| 3,544,355 | 12/1970 | Ott | 184/18 X |
| 3,797,089 | 3/1974 | Abel | 184/1 D |
| 4,274,559 | 6/1981 | Menier | 222/217 |

FOREIGN PATENT DOCUMENTS 2620582 12/1976 Fed. Rep. of Germany ........ 184/18

Primary Examiner—David H. Brown
Assistant Examiner—John E. Griffiths, Jr.

[57] ABSTRACT

Lubricator for bores in members, the lubricator being particularly useful for the lubrication of bores of small diameter with a lubricant of high viscosity. The lubricator has an applicator in the form of an elongated composite plunger having an outer tubular part and inner rod-like part disposed within the tubular part and reciprocable relative thereto. The inner part has an enlarged head thereon disposed axially outwardly of the confronting outer end of the outer tubular part, the head and the confronting end of the outer tubular part in the initial stage of operation of the lubricator defining a toroidal gap which receives and retains lubricant which it picks up as the outer end of the composite plunger travels through a reservoir for lubricant and thence into the bore of the member. The outer and inner parts of the plunger are then reciprocated relative to each other to narrow or close the gap, following which the plunger is withdrawn from the bore, distributing the lubricant therealong as it is retracted from the bore.

7 Claims, 7 Drawing Figures

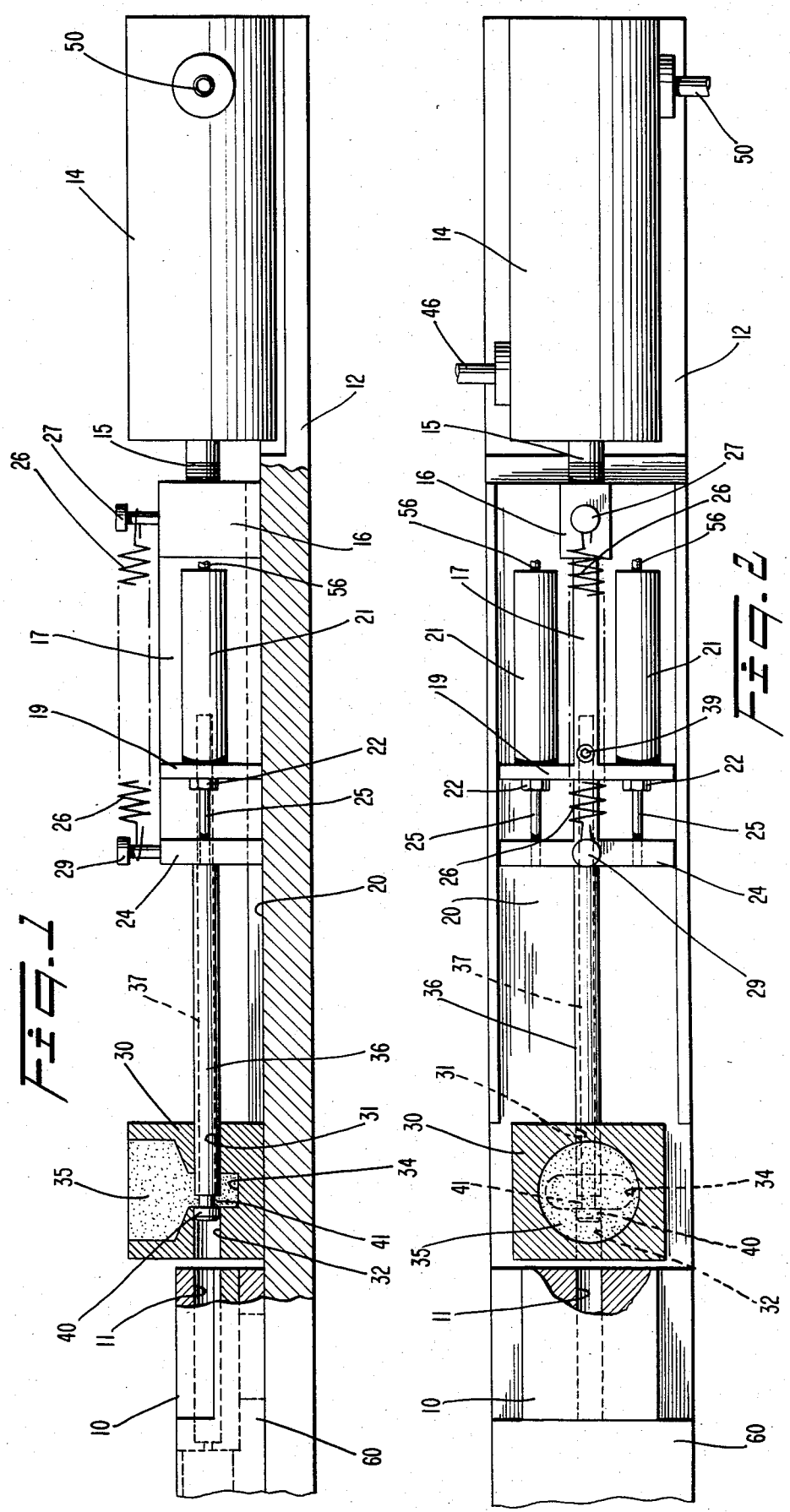

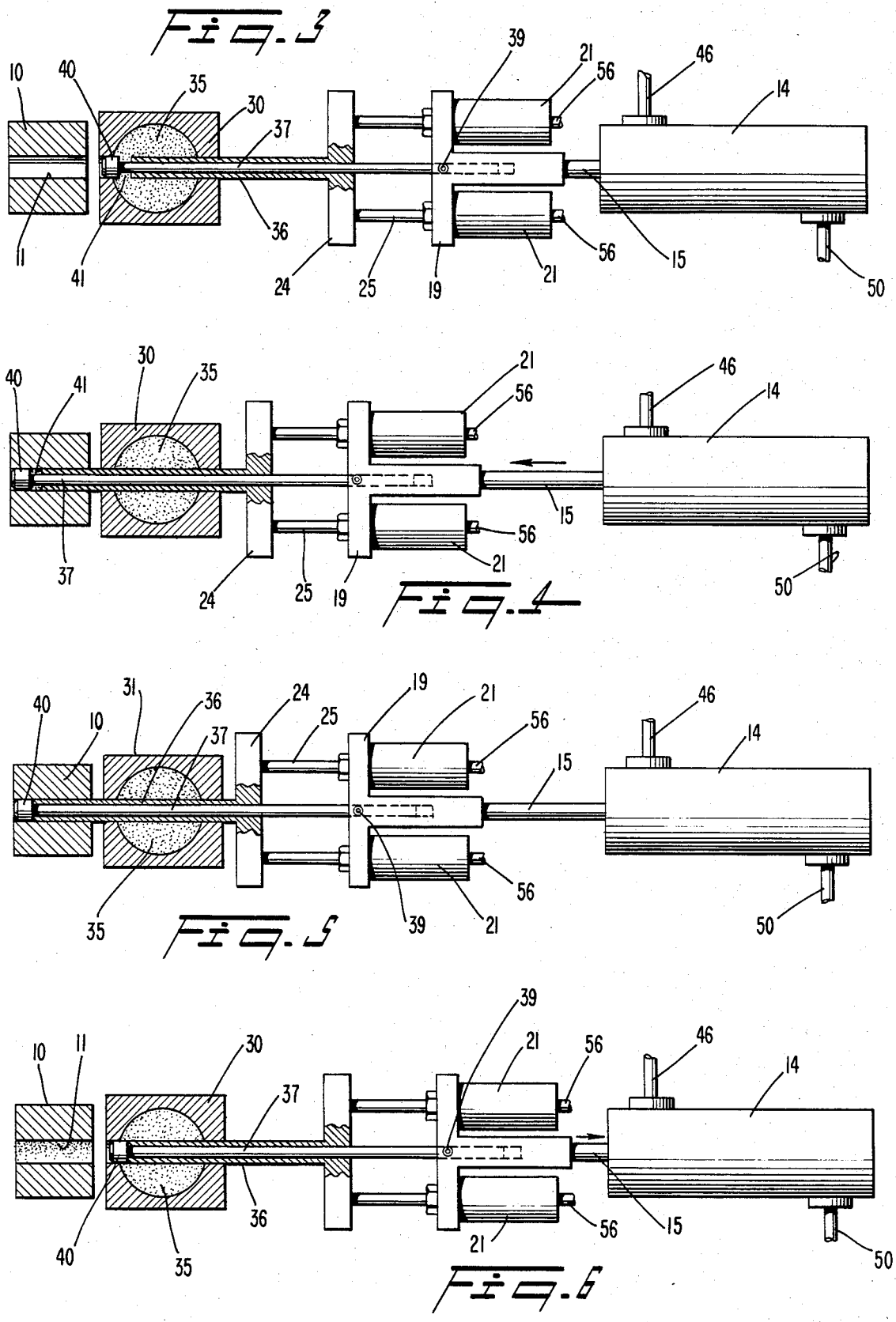

BORE LUBRICATOR

This invention relates to a method of and an apparatus for lubricating the wall of a passage in an article, in the preferred illustrative embodiment thereof the passage being a bore of relatively small diameter and the lubricant applied to the wall thereof being a fluid of relatively high viscosity. It is to be understood, however, that the invention is not thus limited.

By way of example only, the method of the invention and the apparatus for practicing it may be applied to the lubricating of the piercing pin-receiving bore of an inflator such as that which is shown in Mackal U.S. Pat. No. 3,809,288, May 7, 1974. Such inflator has a bore of relatively small diameter within which a piercing pin is driven in a forward $CO_2$ cartridge-piercing direction by a cam which moves it against the opposition of a relatively small and weak coil compression spring. The pin is sealed against the leakage of $CO_2$ therepast by an O-ring disposed on the outer end of the piercing pin. It is necessary that the O-ring maintain a gas-tight seal with the bore in the inflator body, while permitting the piercing pin to move rearwardly away from the $CO_2$ capsule neck following the piercing operation under the action of the spring. It is thus necessary that the wall of the bore be lubricated substantially uniformly therealong to prevent the binding of the piercing pin in it.

Such bore lubricating operation before the present invention has been carried out manually, and has proved to be both timeconsuming and not altogether satisfactory because of the lack of uniformity of lubrication of the wall of the bore, some areas being over-lubricated and others not being lubricated at all.

Such prior manual lubrication of the bore has been carried out, for example, by the dipping of a swab into a pool of lubricant, following which the swab is traversed through the bore to be lubricated. The amount of lubricant applied to the wall, even if the wall should be covered with lubricant throughout its length, is not readily controlled, so that either too much or too little lubricant may be applied.

The present invention has among its objects the provision of a novel method of and apparatus for lubricating the wall of a bore by a liquid or semi-liquid lubricant, such lubrication being carried out mechanically and at least semi-automatically. In accordance with the invention, the amount of lubricant to be applied to the wall of the bore may be readily adjusted, and thereafter is maintained so that each subsequent workpiece of the same character is similarly lubricated.

The invention will be more readily understood upon consideration of the accompanying drawings, in which:

FIG. 2 is a view in plan of the apparatus shown in FIG. 1;

FIG. 3 is a fragmentary view in plan of the apparatus of FIGS. 1 and 2, with the parts of the apparatus being shown in the positions which they are shown as occupying in FIGS. 1 and 2, at the start of a bore-lubricating operation;

FIG. 4 is a view similar to FIG. 3 but with the parts of the apparatus having changed their positions in order to insert the lubricant applicator into the bore or a workpiece to lubricate it;

FIG. 5 is a view similar to FIG. 4 showing the next stage of the lubricating operation, in such stage the lubricant having been dispensed into the bore from between the lubricant-applying parts of the application of the apparatus;

FIG. 6 is a view similar to FIG. 3, that is, the parts have generally returned to their initial positions, with the exception, however, that the applicator of the apparatus has not as yet been opened to receive a fresh charge of lubricant therein; and FIG. 7 is a schematic lay-out of the pneumatic system of the apparatus of the invention.

Figure 1:
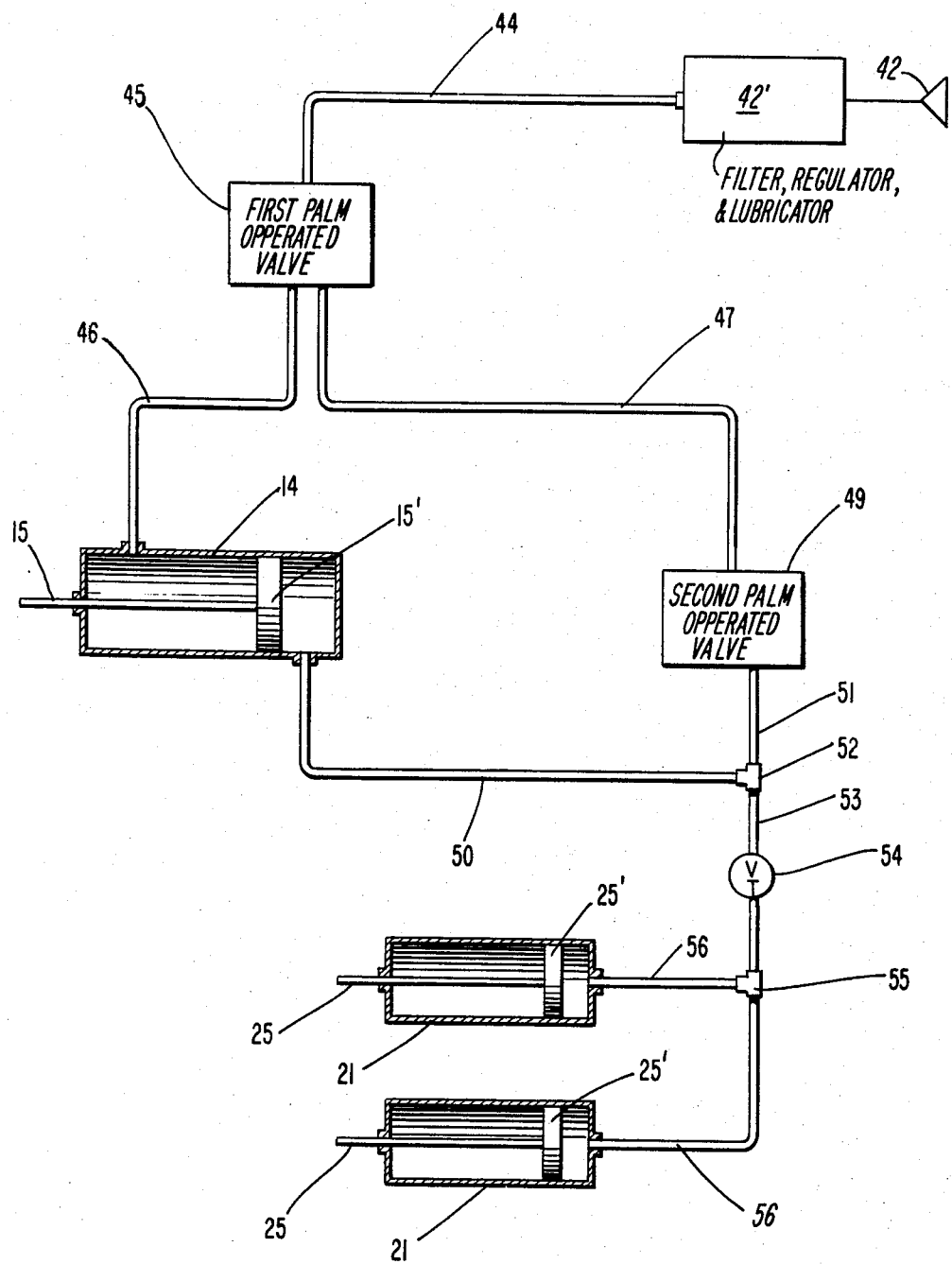
FIG. 1 is a schematic view partially in side elevation and partially in vertical section of a preferred embodiment of apparatus in accordance with the invention.

Turning first to FIGS. 1 and 2, there is there shown a workpiece 10 with a bore 11 to be lubricated in accordance with the invention. The apparatus is shown with an elongated base member or frame 12 upon the right-hand end of which there is affixed a first, main air cylinder 14, cylinder 14 having a piston 15' (FIG. 7) reciprocable therein, there being a piston rod 15 connected to the piston 15' and extending through the left-hand end of the cylinder. Piston rod 15 is fixedly connected to a post 16 which is connected by a longitudinally extending member 17 to a first cross-head 19 which reciprocates in a guideway 20 on the base member 12. Affixed at their left-hand ends by nuts 22 to the first cross-head 19 are two similar parallel second air cylinders 21 disposed symmetrically transversely on opposite sides of the member 17 and parallel thereto. Each of the cylinders 21 has a piston 25' (FIG. 7) therein to which there is affixed a piston rod 25 which extends to the left and is attached at its outer end to a second cross-head 24 which also reciprocate in guideway 20. Whereas the main air cylinder 14 is double-acting, each of the cylinders 21 is single-acting, the piston rods 25 thereof being thrust to the left from the terminal positions thereof shown in FIG. 7 upon the admission of air under pressure through flexible conduits 56 connected to ports in the right-hand ends of the cylinders 21, the piston rods 25, and the second cross-head 24 being returned to the right to their initial, terminal positions, upon the exhausting of air from the cylinders 21 through the conduits 56, by a coil tension spring 26 which extends between a first central post 27 on the main post 16 and a second central post 29 on the second cross-head 24.

Mounted on the base or frame 12 to the left of the second cross-head 24 is a lubricant reservoir 30 having a deeper transversely narrow space 34 in the bottom thereof. Through the walls of the reservoir 30 there extend aligned central horizontal bores 31 (right) and 32 (left) having the same diameter. Through the right-hand bore 31 there extends a first, outer tubular member or plunger 36 the right-hand end of which is affixed to the second cross-head 24 and the left-hand end of which in the position thereof shown in FIGS. 1, 2, 3, and 6 is disposed within the deep space 34 of the space within the lubricant reservoir and immersed in the liquid lubricant 35 therein. Plunger 36 has an outer diameter such that the plunger closely fits within bores 31 and 32. Within the outer tubular plunger 36 there is disposed a rod-like member or second plunger in the form of a plunger rod 37 which fits closely within a plunger 36, the right-hand end of plunger rod 37 being adjustably secured to the first cross-head 19 and the member 17 affixed thereto by a set screw 39, and the left-hand end of the plunger rod 37 having an enlarged head 40 with a diameter which is the same as the outer diameter of the tubular plunger 36. The outer diameters of the head 40 and of the plunger 36 are at least slightly less than that of the bore 11 in the workpiece 10 to be lubricated. The cooperating outer or left-hand ends of plungers 36 and 37 acting together form a lubricant applicator, in the form of a composite plunger as will now appear.

With the parts of the apparatus in the positions which they occupy in FIGS. 1, 2, and 3, there is presented an annular transverse groove or gap 41 between the first transverse left-hand end surface of the tubular plunger 36 and the second right-hand transverse surface of the head 40 on plunger rod 37 which confronts it, gap 41 being disposed in the lower portion 34 of the space within the lubricant reservoir. Accordingly, with the parts thus disposed, liquid lubricant 35 in reservoir 30 flows into and fills the gap 41. When the lubricant 35 is of fairly high viscosity, as is true of silicone oil, such lubricant remains in the form of a "toroidal" drop of predetermined desired volume in the gap 41. The volume of such drop of lubricant depends upon the axial width of gap 41.

FIGS. 3-6, incl., show consecutive steps in the lubricating method of the invention. A workpiece 10 having a bore 11 to be lubricated is placed in a workpiece holder 60 (FIGS. 1 and 2) with the bore 11 in the workpiece in alignment with the path of reciprocation of the composite plunger formed by the tubular plunger 36 and the plunger rod 37. The longitudinal position of the plunger rod 37 will have been suitably adjusted and held in adjusted position by means of the set screw 39 to provide the desired width of the annular lubricant applying gap 41. Air under pressure is now admitted to the right-hand end of the first main gas cylinder 14 through conduit 50 and is exhausted from the left-hand end thereof through conduit 46. This thrusts the piston rod 15, the first cross-head 19, and the second cross-head 24 with the composite plunger 36, 37 to the left whereby to insert the composite plunger into bore 11 of the work piece 10 and to move the other free end of the composite plunger to the left-hand end of the bore 11, as shown in FIG. 4. At this time no air under pressure will have been introduced into the right-hand ends of cylinders 21 through the conduits 55, 56, and the pistons 25 and piston rods 25 remain in their right-hand terminal position in cylinders 21 so that the outer tubular plunger 36 moves with the inner rod plunger 37 to maintain the gap 41 at its initially adjusted width. The lubricant within such gap 41 is thus now (FIG. 4) disposed within the bore 11 adjacent the left-hand end thereof.

With the piston rod 15 of the cylinder 14 and thus the first cross-head 19 remaining in the position of FIG. 4, air under pressure is now introduced into the right-hand ends of the cylinders 21 through the conduit 56, the pistons 25' in the cylinders 21 now moving to the left against the opposition of the coil tension spring 26. This results in the elimination or closing of the gap 41, that is, the forcible expression of the lubricant longitudinally into the bore from the gap 41 as the gap is progressively narrowed, and, in the illustrative embodiment, completely closed. This position of the parts is shown in FIG. 5.

Finally, the parts of the apparatus, with the gap 41 between the confronting surfaces at the left-hand ends of the outer, tubular plunger 36 and the plunger rod 37 having been eliminated, are returned to the initial position thereof shown in FIG. 3 by exhausting air through conduit 50 at the righ-hand end of the cylinder 14 and by introducing air under pressure into the left-hand end of such cylinder through the conduit 46. In order to restore the gap 41 between the left-hand ends of plungers 36 and 37 to its initially adjusted axial width, that is, to restore the parts to the positions thereof shown in FIG. 3, air is exhausted from the right-hand ends of the cylinders 21 through the conduits 56 so that the spring 26 once more moves the outer tubular plunger 36 to the right, thereby again to form an oil or lubricant dispensing gap 41 between the two plungers.

The pneumatic lay-out of the above described apparatus of the invention is shown in FIG. 7. A source 42 of pneumatic pressure is connected by a conduit 44 to a first manually (palm) operated valve 45, one discharge port of which is connected by the conduit 46 to the left-hand end of the main air cylinder 14. A second manually (palm) operated valve 49 is employed, the intake port of which is connected by a conduit 47 to the outlet port of the first valve 45. The outlet port of valve 49 is connected by the tee 52 to a conduit 50 leading to the right-hand end of cylinder 14.

Beyond the tee 52 a conduit 53 leads through an adjustable valve 54 and thence to intake conduits 56 of cylinders 21, conduits 55, 56 being connected in parallel by a tee 55.

The provision of the two palm valves 45 and 49, which are spaced substantially from each other and which must be manually operated simultaneously to make the apparatus work, constitutes a safety feature whereby the operator is prevented from using either of his or her hands in any manner other than to operate the valves, thereby preventing the placing of the hand, in a position wherein they might be injured by the actuation of the various movable parts of the apparatus.

In FIG. 7 the system is pictured in the unactuated position. Air pressure goes from pressure force 42 through a filter, regulator, lubricator combination 42', through the palm valve 45 and holds the main piston rod 15 in the rear, righthand position. Actuation of both valves 45 and 49 permits air to flow into the rear, right-hand chamber of the main cylinder 14. At this stage the composite plunger 36, 37 is extended to the left, but the annular gap 41 has not been closed; this condition is shown in FIG. 4. Adjustable valve 54 retards the flow of air into the small cylinders 21 until the the piston 15' in main cylinder has fully advanced. When the pistons 25' of small cylinders 21 have advanced to the left, the gap 41 closes as shown in FIG. 5. When valves 49 and 45 are released, the piston of the main cylinder 14 retracts, returning the closed gap 41 into the lubricant reservoir, as shown in FIG. 6. Valve 54 however, has retarded the existing flow of air from the small cylinders 21 until the piston of the main cylinder 14 has completely returned to the right. At this time air continues to exit through the exhaust in valve 49 allowing the pistons in cylinders 21 to return, opening the gap and returning the assembly to the positions of the various parts shown in FIG. 3. At this point the operator removes the lubricated object and inserts another object to be lubricated.

It is to be understood that although the annular or toroidal gap between the outer and inner parts of the lubricant applicator has been described as being eliminated or closed after applicator has been introduced into the bore, in some instances it is sufficient that the gap be substantially narrowed without completely eliminating it.

The diameters of tubular plunger 36 and of the head 40 of rod plunger 37 are such that they will fit closely (nominally 0.005 in. maximum clearance) in the bore to be lubricated. The method of actuation shown here is by air cylinders. There are, however, many other methods which could be used. Electrical solenoids could replace the air cylinders, cams, and springs could also replace the air cylinders. The sequence could even conceivable be performed by rack and pinion gears. Combinations of the above could also conceivably be used.

It should be noted that the device of the invention provides uniform lubrication completely around the workpiece bore. The amount of lubrication can be closely metered by simply adjusting the size of the gap 41. This is a very important consideration when using expensive silicone-based lubricants.

Although the invention is illustrated and described with reference to one preferred embodiment thereof, it is to be expressly understood that it is in no way limited to the disclosure of such preferred embodiment but is capable of numerous modifications within the scope of the appended claims.

I claim:

1. Apparatus for lubricating a wall of a bore in an article, comprising an elongated plunger having an outer free end portion with an outer surface and a cross-section at least slightly smaller than that of the bore in the article, means for holding the article having the bore therein with the bore aligned with the plunger, means on the outer free end portion of the elongated plunger presenting an annular transverse groove in the outer surface thereof, means for introducing lubricant into the annular groove in the plunger so as substantially to fill the groove with lubricant, means for moving the elongated plunger along its axis so a to insert the outer free end portion of the plunger with the groove therein for containing lubricant into the bore in the article, means for axially narrowing the groove after said introduction of the outer free end portion of the plunger into the bore in the article so as to expel substantially any lubricant from the groove and to dispense it within the bore circumferentially thereof, and wherein the means for moving is also capable of thereafter withdrawing the elongated plunger with the groove in narrowed condition from the bore, whereby to spread longitudinally of the bore any lubricant which has been dispensed thereinto.

2. Apparatus according to claim 1, wherein the plunger comprises two parts which are movable longitudinally relative to each other, the annular groove on the plunger being formed between confronting transverse surfaces of said two parts thereof, and the means for narrowing the groove comprises means for moving said two parts of the elongated plunger longitudinally relative to each other said outer free end portion of said plunger being a portion of said parts.

3. Apparatus as defined in claim 2, wherein said confronting transverse surfaces are annular.

4. Apparatus according to claim 3, wherein one of said two parts of the elongated plunger is a tubular member, and the other of said two parts of the plunger is a rod-like member closely fitting within and reciprocable relative to the tubular member.

5. Apparatus according to claim 4, wherein the tubular member has a transverse annular end surface which constitutes one of said confronting transverse surfaces, and said rod-like member has a head thereon extending beyond said annular transverse surface of the tubular member, the head on the rod-like member having the other transverse annular surface.

6. The apparatus according to claim 1, wherein the means for introducing lubricant into the groove in said elongated plunger comprises a lubricant-containing reservoir through which the outer free end portion of the plunger containing the groove moves before it is introduced into the bore in said article.

7. Apparatus according to claim 6, wherein said elongated plunger is disposed horizontally and reciprocates along a horizontal path, and the lubricant-containing reservoir and the means for holding the article to be lubricated are disposed in horizontal alignment.

* * * * *